Dec. 16, 1941.  E. D. SCHNEIDER ET AL  2,266,569
TEMPERATURE CONTROL SYSTEM
Filed Aug. 18, 1939

Inventors:
Elbert D. Schneider,
August R. Ryan,
by Harry E. Dunham
Their Attorney.

Patented Dec. 16, 1941

2,266,569

UNITED STATES PATENT OFFICE 2,266,569

TEMPERATURE CONTROL SYSTEM

Elbert D. Schneider, Scotia, and August R. Ryan, Schenectady, N. Y., assignors to General Electric Company, a corporation of New York Application August 18, 1939, Serial No. 290,858

15 Claims. (Cl. 236—15)

This invention relates to temperature control systems such as used in the control of electric heating devices, furnaces and the like, and has for its object a simple and reliable system giving close regulation of the temperature.

In carrying out our invention in one form, we utilize a variable impedance device shown as saturable reactor for controlling the current input into the furnace or other heating apparatus, together with an electric discharge device for supplying direct current to vary the saturation of the reactor. This discharge device is controlled in accordance with the difference between the voltages across two condensers, one of which is charged through a Wheatstone bridge in accordance with the temperature of the furnace while the other is charged in accordance with the voltage across the furnace heating resistor.

We also provide means for varying the sensitivity of the control apparatus so as to vary the temperature change required to cause the energy input to the furnace to be varied from maximum to minimum and vice versa. Another feature is the provision of means for compensating for the change in temperature required to cause the control to vary appropriately the amount of energy input to the furnace, whereby the furnace is maintained at a substantially constant temperature irrespective of variations in the load.

Figure 1:
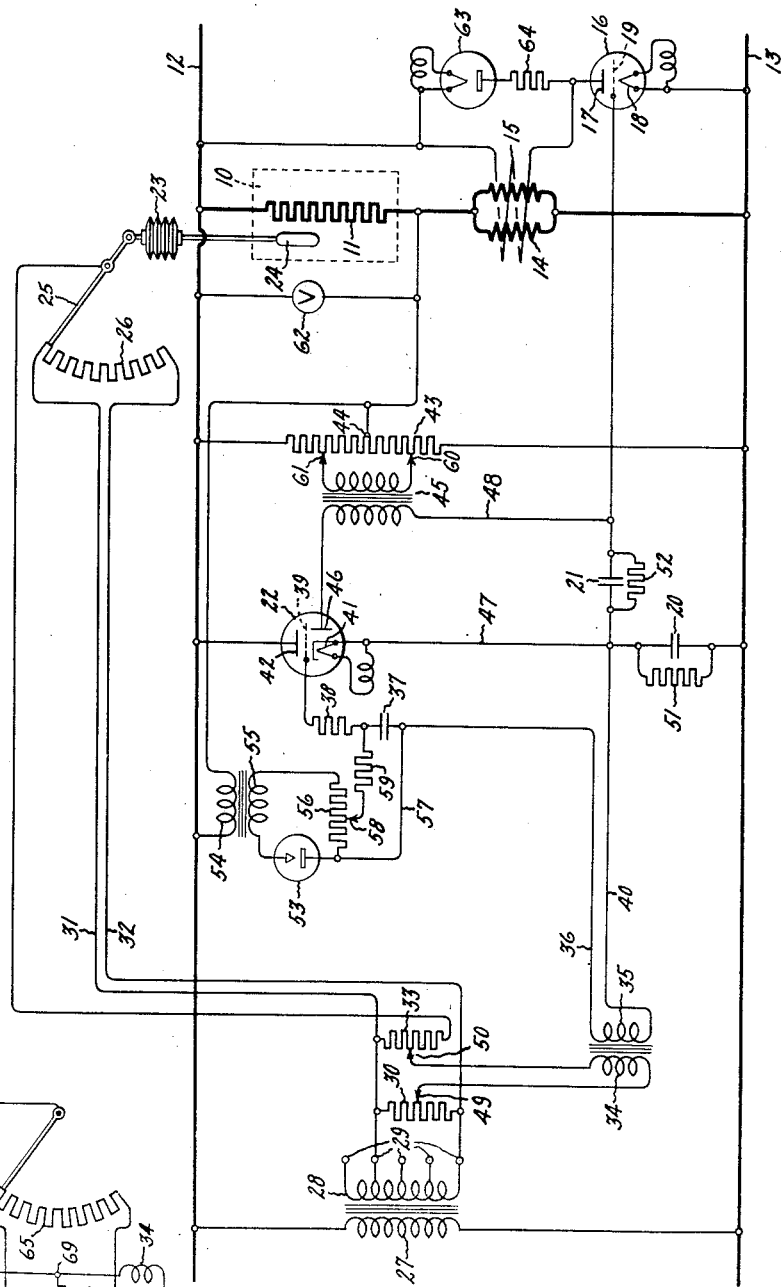
Figure 2:
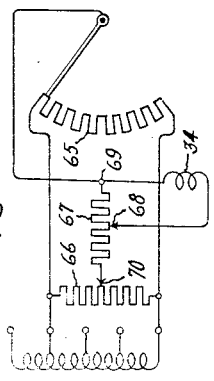

For a more complete understanding of this invention reference should be had to the accompanying drawing, Fig. 1 of which is a diagrammatical representation of a system of control of an electric furnace embodying our invention; while Fig. 2 is a fragmentary view showing a modified form of our invention.

Referring to the drawing, we have shown our invention in one form as applied to an electric furnace 10 provided with a heating resistor 11 which is supplied with energy from suitable alternating current supply mains 12 and 13, a reactor coil 14 having a saturable iron core being connected in the circuit with the resistor 11. This reactor 14 may be saturated to the desired degree by supplying direct current to a saturating winding 15, the degree of saturation being varied to control the amount of energy input to the resistor 11.

This winding 15 is supplied with direct current from the mains 12 and 13 through the agency of an electric valve device 16 shown as an electric discharge device acting as a rectifier and connected in circuit with the winding 15. The discharge device 16 is preferably of the three-element vapor electric type characterized by large power output controlled by a small amount of grid energy. As is well known in the art, the sealed envelope of this device contains a small quantity of inert gas such as a mercury vapor whereby the device becomes an arc rectifier. The arc formation between the anode 17 and the cathode 18, and hence the conductivity of the discharge device, is controlled by a grid 19. It will be understood that at certain critical values of grid voltage, when the anode is positive, the arc will start and will continue thereafter independently of the grid voltage as long as the anode is positive. Furthermore, as long as the grid voltage is more negative with respect to the anode voltage than the critical value at which the arc starts, the arc is prevented from starting and no current flows through the discharge device.

The discharge device 16 is furthermore controlled through the agency of condensers 20 and 21 and a rectifying discharge device 22 as described and claimed in U. S. Patent No. 1,904,485 to Orrin W. Livingston, dated April 18, 1933.

Suitable temperature responsive means responsive to the temperature of the furnace 10 is provided for controlling the discharge device 22. This temperature responsive means is shown as an expansion bellows 23 connected through a tube to a bulb 24 in the furnace, the bellows tube and bulb being filled with a liquid or gas whose volume changes in response to changes in temperature. The bellows 23 is thus caused to operate a contact arm 25 over a potentiometer control resistor 26 so as to vary the amount of the resistance 26 connected in a control circuit and thereby control the discharge device 22.

For energization of the control circuit, a suitable transformer 27 is provided having its primary winding connected across the supply mains 12 and 13 supplied with alternating currents of a suitable potential and frequency, such as 110 volts, 60 cycles. Its secondary winding 28 is provided with taps 29, across two selected taps of which is connected a potentiometer resistance 30. Also connected to the same taps in parallel with the resistance 30 is the potentiometer resistance 26, its connections being through the conductors 31 and 32. A third potentiometer resistance 33 has one end connected to the upper one of the two selected taps, i. e., to the conductor 31 and its other end connected to the contact arm 25. A voltage is supplied from selected points on the resistances 30 and 33 to the terminals of the primary winding 34 of a transformer having a secondary winding 35. It will be observed that the resistances 26 and 36 constitute a Wheatstone bridge. The terminals of the secondary winding 35 are connected respectively through a conductor 36, a condenser 37 and resistance in parallel therewith, and a current limiting resistance 38 to the grid 39 of the discharge device 22, and through the conductors 40 and 47 to the cathode 41 of the discharge device 22.

In the operation of the system, movement of the contact arm 25 in response to a change in temperature varies the voltage applied to the transformer primary winding 34 and hence the voltage applied by secondary 35 to the grid 39. When this voltage becomes sufficiently positive or rather sufficiently less negative with respect to the anode 42 of the discharge device 22, the discharge device passes current substantially proportional to the grid voltage during the positive half of each alternating current cycle. This current is utilized to charge the condenser 20 which is connected in series with the discharge device 22 across the supply mains 12 and 13.

Assuming zero voltage for the moment across the condenser 21, when the voltage on the condenser 20 builds up to a predetermined value, the grid 19 of the device 16 which is connected to the positive side of the condenser 20 becomes sufficiently positive to cause the device 16 to pass current, which current passes through the winding 15 and tends to saturate the reactor, thereby increasing the current passing through the resistor 11. As a result, the furnace temperature increases.

When the furnace temperature increases, the contact arm 25 is moved by the expansion of the bellows 23 downward over the resistance 26. This decreases the voltage applied to the primary winding 34 whereby the discharge device 22 is controlled to pass less current and the voltage across the condenser 20 is thereby appropriately limited. Eventually the contact arm 25 comes to rest at some point on the resistance 26 corresponding to the furnace temperature for which the control is adjusted, which adjustment is described in detail hereinafter. When the arm 25 comes to rest, a balanced condition prevails in the system in which the resistor 11 is supplying the required amount of heat to the furnace to just maintain the temperature represented by that position of the arm 25. In this balanced condition, the voltage applied to the primary winding 34 is just sufficient to control the discharge device 22 to give the required voltage across the condenser 20 to provide for operation of the discharge device 16 over portions of the positive halves of the alternating current cycles required to give the necessary saturation of the reactor 14 for the required current in the furnace resistor 11. It will be observed that the condenser 20 is charged to a voltage substantially proportional to the temperature of the furnace and energy input to the furnace.

The condenser 21 introduces a feed-back control for the discharge device 16 which is proportional to the voltage across the resistor 11 which, in turn, of course is proportional to the current in the resistor, i. e., the rate of heat generation in the furnace. The condenser 21 is charged with a polarity opposite to the polarity of the condenser 20 so as to neutralize in part the effect of the condenser 20. At the predetermined furnace temperature for which the control apparatus is adjusted, the differential voltage applied to the grid 19, i. e., the condenser 20 voltage minus the condenser 21 voltage is just sufficient to give the required control of the discharge device 16.

This charging of the condenser 21 is effected by a potentiometer resistance 43 having one end connected as shown to the supply main 12, its other end connected to the supply main 13 and an intermediate point 44 connected to the side of the resistor 11 opposite the supply main 12. Thus the voltage across the resistor is applied to the upper portion of the potentiometer resistance 43, i. e., to that portion between the point 44 and the supply main 12, and the voltage across the reactor 14 is applied to the lower portion of the resistance 43. A voltage from the resistance 43 is applied through a transformer 45 to a second anode 46 in the discharge device 22, the circuit through the discharge device leading from the cathode 41 through the conductor 47, the condenser 21, the conductor 48 and the secondary of the transformer 45 to the anode 46. This circuit for the condenser 21 does not have grid control in the discharge device 22 which acts as a rectifier supplying current to charge the condenser 21 substantially in proportion to the voltage applied by the transformer 45.

The temperature to be maintained in the furnace is adjusted by adjusting the position of the tap 49 for the transformer winding 34. Also the amount of movement of the contact arm 25 required between maximum and minimum current inputs to the resistor 11, i. e., the sensitivity of the control, is adjusted by moving the tap 50 on the resistance 33. When the furnace is cold and the contact arm 25 in the position indicated in the drawing, the maximum possible voltage for the particular setting of the tap 49 is applied to the winding 34. As the furnace temperature rises, the contact arm 25 is moved downward over the resistance 26 until a position is reached in which the current supplied to the saturated winding 15 is just sufficient to give the necessary current in the resistor 11 to maintain the temperature corresponding with that position of the contact arm 25.

It will now be observed that if the tap 49 is moved, the voltage applied to the winding 34 is changed and consequently the temperature of the furnace will change until the contact arm 25 is moved to some new position in which the control system is balanced again. In other words movement of the tap 49 adjusts the relation between the temperature responsive means 25 and the voltage across the condenser 20. For each position of the tap 49 the condenser is charged to a different voltage and a different temperature is maintained in the furnace.

Adjustment of the tap 50 also changes the voltage applied to the winding 34, but this change in voltage is merely a change in amplification of the voltage change effected by the arm, i. e. sensitivity as previously pointed out. If the tap 50 is moved upward as seen in the drawing to the upper end of the resistance 33, then movement of the contact arm 25 has no effect whatever on the voltage across the winding 34. On the other hand, if the tap 50 is moved to its other extreme position, that is to the lower end of the resistance 33, the voltage of the contact arm 25 is then applied directly to the tap 50. This position of the tap 50 therefore gives the greatest sensitivity of response to the position of the contact arm 25. Intermediate positions of the tap 50 give lower sensitivity.

This means simply that with the tap 50 in its lowermost position of greatest sensitivity, a relatively small movement of the contact arm 25, i. e., small change in temperature, changes the current in the resistor 11 from maximum to minimum or vice versa. If the sensitivity is made too great, however, temperature overshooting or hunting occurs with wide temperature variations. The control would then be in effect a full energy on or full energy off control. In order to obtain the advantage of the gradual change in energy input possible with the saturable reactor, the tap 50 is adjusted for a sensitivity low enough so that no temperature overshooting occurs. This adjustment will depend somewhat upon the operating conditions of the furnace, i. e., whether the furnace is subjected to sudden and great changes in temperature. If subjected to such great changes in temperature, the tap 50 will preferably be set to give the greatest possible sensitivity without overshooting.

The resistance 51 connected in parallel with the condenser 20 is preferably of such high value as to maintain a substantially constant voltage across the condenser 20 from the pulsating voltage supplied to the condenser from the discharge device 22. In other words, the resistance is of such value that the voltage of the condenser decreases very little by leaking through the resistance 51 between the voltage pulsations applied thereto. The resistance 52 connected around the condenser 21, on the other hand, is of a relatively lower value so that between the pulsating voltages applied to the condenser 21, the voltage of the condenser decreases materially, in a typical case to less than one-half the peak pulsating voltage. As a result of this drop in the voltage across the condenser 21, the differential control voltage applied to the grid 19 is pulsating so that the discharge device 16 is controlled in response to this differential voltage to pass current through the required portions of the positive voltage half cycles to maintain the desired temperature.

We have also provided means for introducing a correction to compensate for the change in maintained furnace temperature resulting from a change in the furnace load. For example, the furnace may be a continuous one through which a strip of material is being fed continuously at a predetermined speed, for example, for annealing purposes. As long as the weight of the material per unit time being passed through the furnace remains unchanged and the speed remains constant and the furnace is not effected by other variables, the furnace temperature will be held at a predetermined desired value without any substantial change in the current flowing in the resistor 11. However, if the speed of passage of material through the furnace is changed or if materal having a different weight is passed through, then the balanced condition is disturbed by the resulting change in temperature of the furnace and movement of the contact arm 25. The current in the resistor 11 is then automatically readjusted to again balance the condition but with the control thus far described this new balance will be effected at a slightly different maintained temperature which is just sufficient to move the contact arm 25 far enough to effect the required change in current in the resistor 11. For example, if the rate of feed of the material is increased through the furnace so that the furnace temperature drops, the balanced condition will be restored at a somewhat lower maintained temperature.

The amount of this increase or decrease in furnace temperature required to reestablish balanced conditions after a change in the furnace load depends upon the sensitivity of the temperature responsive control, that is on the adjustment of the tap 50. As previously stated, when the sensitivity is high, a relatively small amount of movement of the contact arm 25 is required to make the desired change in energy input to the resistor 11. Consequently, under such conditions, balanced conditions will be restored with the maintained furnace temperature only slightly different from the first maintained temperature. In a typical furnace it was found that changes in operating conditions requiring relatively great changes in input to the resistor 11 were brought about by a change in the maintained furnace temperature of one or two degrees C. Of course, it wil be understood that the furnace temperature initially changed more than this one or two degrees, perhaps enough to apply full energy input. Thereafter as balanced conditions were restored the temperature was held at the new temperature.

This means which we have provided for compensating for this change in the maintained temperature comprises a one-way rectifier discharge device 53 which charges the condenser 37 to a value dependent upon the voltage drop across the resistor 11 and in such direction as to offset any change in this voltage drop. As shown, we have provided a transformer having its primary 54 connected across the resistor 11 and its secondary 55 connected to the terminals of the rectifier 53, a potentiometer resistance 56 being included in the rectifier circuit. One terminal of the resistance 56 is connected through a conductor 57 to one side of a consider 37 and a preselected intermediate point of the resistance 56 is connected through an adjustable tap 58 and a resistance 59 to the other side of the condenser 37. The resistance 59 is of such value as to give a time delay in the change of the condenser charge corresponding to any changed value of voltage drop across the resistor 11. This time is preferably about the same as the time required for the furnace temperature to be restored. The addition voltage of the condenser 37 which is in the same direction and added to the voltage across the transformer winding 35 causes a small additional change in the energy input to the resistor 11 whereby the furnace temperature is brought back very closely to the original temperature; in a typical furnace to within one-half of one degree C. The amount of this correction, i. e., the control voltage introduced by the condenser 37 is adjustable by moving the tap 58 on the resistance 56.

The potentiometer resistance 43 with the adjustable taps 60 and 61 for the transformer 45 affords both a feed-back control through the condenser 21 and a convenient adjustment means for the electric apparatus. The tap 60 is adjusted to adjust the relation between the voltage across the condenser 20 and the current input to the saturating winding 15. Also, by adjusting the tap 61 the maximum possible current in the winding 15 can be limited to that current which will just saturate the reactor.

Preferably the taps 60 and 61 for the primary of the transformer 45 are adjusted on the resistance 43 in the following manner: With the condenser 20 discharged, the tap 60 is moved downward on the resistance 43 as seen in the drawing, i. e., toward the supply main 13, to such a point that the discharge device 16 does not pass any current. Under these conditions, of course, the reactor 14 is unsaturated and, consequently, there is no appreciable current in the resistor 11 and no appreciable voltage drop across it. With this adjustment, any voltage across the condenser 20 thereafter produced by operation of the discharge device 22 starts operation of the discharge device 16 throughout portions of the positive half cycles.

Next, after the condenser 20 has been fully charged, the tap 61 is moved upward in the resistance 43, i. e., toward the supply main 12 until the voltage across the resistor 11 begins to decrease as indicated by a suitable voltmeter 62 connected across the resistor. This decrease in the voltage across the resistor indicates that the reactor is just fully saturated and, in other words, the winding 15 is supplied with only sufficient current to saturate the reactor. It will be understood that if the current in the winding 15 is increased beyond the point of substantial saturation of the reactor but little, if any, useful purpose is served by this increase in current. This adjustment of the tap 61 prevents such increase.

Also the tap 60 may be adjusted to vary the sensitivity of the control. For example, to increase the sensitivity, the voltage across the condenser 20 is set at one-half of the voltage across the mains 12 and 13. Then, with this voltage on the condenser 20, the tap 60 is lowered or suitably adjusted until the discharge device 16 no longer passes current. Then the condenser 20 is charged to full voltage and the tap 61 is adjusted as before. This adjustment gives full energy input to resistor 11 throughout the upper half of the voltage charge on the condenser 20, which means that the change in temperature required for full change in the current through the resistor is one-half of that required with the setting previously described. This sensitivity adjustment by changing the position of the tap 60 will preferably be an installation adjustment, it being contemplated that subsequent adjustments can be made more conveniently by adjusting the tap 50.

A suitable half-wave rectifying discharge device 63 is connected in parallel with the saturating winding 15. This rectifying device passes current during the half cycles that the discharge device 16 is not operating so as to prevent substantial change in the current in the winding 15. This current through the rectifier is set up by the inductive voltage across the winding 15 when the discharge device 16 ceases to operate.

A resistance 64 is provided to limit the short circuit current in the event either tube 16 or 63 should arc back for one or two cycles.

In Fig. 2, we have shown a modified form of electrical connections for the resistances 26, 30 and 33 of Fig. 1, these resistances being indicated in Fig. 2 respectively by the reference numerals 65, 66 and 67. With this arrangement, when the slider 68 is moved toward the point 69 to decrease the sensitivity of the control apparatus, the adjustment of the temperature control slider 70 is made less critical.

It will be understood that the contact arm 25 can be actuated by various other forms of temperature responsive means in addition to the bellows type device 23, shown in the drawing. Moreover, the contact arm may, of course, be operated in response to different functions other than temperature, such as pressure, which may not be as directly responsive to temperature as the pressure responsive device 23. In the appended claims, the term "temperature responsive" is therefore defined by us to describe any operating means for the contact arm 25 which is responsive to variations in the energy input to the heating resistor 11, either directly or indirectly, and even though the pressure of fluid, such as steam, may be the primary quantity to be maintained. For example, the contact arm 25 might be operated in response to the pressure in a boiler so as to maintain a predetermined vapor pressure in the boiler but, indirectly, in thus maintaining a predetermined pressure, the vapor is maintained at a predetermined temperature. Moreover various other types of electric heating means may be used, such as induction heating means.

While we have shown a particular embodiment of my invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States, is:

1. An electric furnace control system comprising an electric heating resistor, a saturable core reactor connected in circuit with said resistor, a saturating winding for said reactor, electric discharge means for supplying current to said winding, two resistances connected in parallel with each other, means for applying a voltage to said resistances, a third resistance having one terminal connected to one terminal of said other two resistances and its other terminal connected to an intermediate point of one of said first two resistances, connections for applying a voltage between intermediate points of the other of said first two resistances and said third resistance for the control of said discharge means, temperature responsive means for adjusting the position of said first-mentioned intermediate point, and means responsive to the voltage across said heating resistor for controlling said discharge means.

2. Temperature control apparatus comprising an electric heating resistor, a saturable core reactor connected in circuit with said resistor, a saturating winding for said reactor, electric discharge means for supplying current to said winding, two resistances connected in parallel with each other, means for applying a voltage to said resistances, a third resistance having its terminals respectively connected to intermediate points of said first two resistances, connections for applying a voltage across said third resistance for the control of said discharge means, temperature responsive means for adjusting the position of said intermediate point, and means responsive to the voltage across said heating resistor for controlling said discharge means.

3. A temperature control system comprising an electric heating element, a variable impedance device for controlling said element, a control winding for said impedance device, a condenser, temperature responsive means for charging said condenser to a voltage substantially proportional to the temperature to which said temperature responsive means is responsive, discharge means responsive to the voltage across said condenser for supplying current to said control winding, and means for adjusting said proportional relation between said temperature responsive means and the voltage across said condenser.

4. A temperature control system comprising an electric heating resistor, a saturable core reactor connected in circuit with said resistor, a saturating winding for said reactor, a condenser, temperature responsive means for charging said condenser, discharge means responsive to the voltage across said condenser for supplying current to said saturating winding, means for adjusting the relation between said temperature responsive means and the voltage across said condenser, and means responsive to the voltage across said resistor for controlling the voltage across said condenser.

5. A temperature control system comprising an electric heating resistor, a saturable core reactor for controlling the voltage across said resistor, a saturating winding for said reactor, a condenser, temperature responsive means for charging said condenser, a second condenser, means responsive to the voltage across said resistor for charging said second condenser, and electric discharge means responsive to the difference between the voltages across said condensers for supplying current to said saturating winding.

6. A temperature control system comprising an electric heating resistor, a saturable core reactor connected in circuit with said resistor, a saturating winding for said reactor, a condenser, temperature responsive means for charging said condenser, a second condenser, means responsive to the voltage across said resistor for charging said second condenser, electric discharge means responsive to the difference between the voltages across said condensers for supplying current to said saturating winding, and means for adjusting the relation between said temperature responsive means and the voltage across said first condenser.

7. A temperature control system comprising an electric heating resistor, a saturable core reactor connected in circuit with said resistor, a saturating winding for said reactor, a condenser, temperature responsive means for charging said condenser to a predetermined voltage corresponding to a predetermined temperature, a second condenser connected to said first condenser, means responsive to the voltage across said resistor for charging said second condenser with a voltage in opposition to the voltage across said first condenser, resistances connected across said condensers, said second condenser having the lower resistance, electric discharge means responsive to the difference between said voltages for supplying current to said saturating winding, and means for adjusting the relation between said temperature responsive means and the voltage across said first condenser.

8. A temperature control system comprising an electric heating resistor, a saturable core reactor connected in circuit with said resistor, a saturating winding for said reactor, a condenser, a discharge device provided with a control grid for charging said condenser, a second condenser connected to said first condenser, means responsive to the voltage across said resistor for charging said second condenser with a voltage in opposition to the voltage across said first condenser, electric discharge means responsive to the difference between said voltages for supplying current to said saturating winding, temperature responsive means for controlling the voltage supplied to said grid, and means for adjusting the relation between the voltage supplied to said grid and said temperature responsive means.

9. The combination with an electric furnace, of a heating resistor therefor, a saturable core reactor connected in circuit with said resistor, a saturating winding for said reactor, a condenser, a Wheatstone bridge potentiometer including a variable resistance, means responsive to the temperature of said furnace for varying said resistance, means responsive to a voltage across said bridge for charging said condenser, a second condenser, means responsive to the voltage across said resistor for charging said second condenser, and electric discharge means responsive to the difference between the voltages across said condensers for supplying current to said saturating winding.

10. The combination with an electric murnace, of a heating resistor therefor, a saturable core reactor connected in circuit with said resistor, a saturating winding for said reactor, a condenser, a Wheatstone bridge potentiometer including a variable resistance, means responsive to the temperature of said furnace for varying said resistance, means responsive to a voltage across said bridge for charging said condenser, a second condenser, means responsive to the voltage across said resistor for charging said second condenser, electric discharge means responsive to the difference between the voltages across said condensers for supplying current to said saturating winding, and means for adjusting said voltage across said bridge independently of said variable resistor to vary the temperature maintained in said furnace.

11. The combination with an electric furnace, of a heating resistor therefor, a saturable core reactor connected in circuit with said resistor, a saturating winding for said reactor, a condenser, a Wheatstone bridge potentiometer including a variable resistance, means responsive to the temperature of said furnace for varying said resistance, electric discharge means for charging said condenser, means responsive to a voltage across said bridge for controlling said discharge means, a second condenser, means responsive to the voltage across said resistor for charging said second condenser, electric discharge means responsive to the difference between the voltages across said condensers for supplying current to said saturating winding, means responsive to the voltage across said resistor for controlling the voltage across said first condenser to compensate for the change in temperature required to effect a change in the current in said resistor, and means for adjusting said voltage across said bridge independently of said variable resistor to vary the temperature maintained in said furnace.

12. A temperature control system comprising electric heating means, variable impedance means connected in circuit with said heating means, a control winding for said impedance means, a condenser, temperature responsive means for charging said condenser, a second condenser, means jointly responsive to the voltages across said heating means and said impedance means for charging said second condenser, and means responsive to the difference between the voltages across said condensers for supplying current to said control winding.

13. A temperature control system comprising electric heating means, variable impedance means connected in series with said heating means, a saturating winding for said impedance means, a control resistance connected across said heating means and said impedance means, an electrical connection between an intermediate point of said control resistance and a point between said heating means and said impedance means, control means for supplying current to said saturating winding, and adjustable connections between said control means and said control resistance on opposite sides of said intermediate point whereby said control means is jointly responsive to the voltages across said heating means and said impedance means, so as to supply current to said saturating winding.

14. A temperature control system comprising electric heating means, a variable impedance means connected in series with said heating means, a saturating winding for said impedance means, a control resistance connected across said heating resistor and said impedance means, an electrical connection between an intermediate point of said control resistance and a point between said heating means and said impedance means, a transformer provided with two inductively associated windings, adjustable connections between the terminals of one of said windings and said control resistor on opposite sides of said intermediate point, temperature responsive means for producing a voltage, and means responsive to the difference between said voltage and the voltage across the terminals of the other of said transformer coils for supplying current to said saturating winding.

15. A temperature control system comprising an electric heating resistor, a saturable core reactor connected in series with said resistor, a saturating winding for said reactor, a control resistance connected across said heating resistor and said reactor, an electrical connection between an intermediate point of said control resistance and a point between said heating resistor and said reactor, a transformer provided with two inductively associated windings, adjustable connections between the terminals of one of said windings and said control resistor on opposite sides of said intermediate point, a condenser, means for charging said condenser in accordance with the voltage of the other of said transformer coils, a second condenser, temperature responsive means for charging said second condenser, and means responsive to the difference between the voltages of said condensers for supplying current to said saturating winding.

ELBERT D. SCHNEIDER.
AUGUST R. RYAN.